United States Patent [19]

Wang

[11] Patent Number: 4,689,953
[45] Date of Patent: Sep. 1, 1987

[54] VARIABLE RATE DRIVE STRAP

[75] Inventor: Ting M. Wang, Warren, Mich.

[73] Assignee: Borg-Warner Automotive, Inc., Troy, Mich.

[21] Appl. No.: 896,375

[22] Filed: Aug. 14, 1986

[51] Int. Cl.$^4$ ............................ F16F 1/18; F16D 3/52
[52] U.S. Cl. ...................................... 60/330; 267/160; 464/100
[58] Field of Search ................. 464/161, 100, 101, 84, 464/69; 267/41, 160, 158; 60/330; 192/106.1

[56] References Cited

U.S. PATENT DOCUMENTS

| | | | |
|---|---|---|---|
| 1,124,966 | 1/1915 | Stack | 464/69 X |
| 2,172,678 | 9/1939 | Heftler | 267/158 X |
| 2,179,149 | 11/1939 | Gruenberger | 60/54 |
| 2,588,668 | 3/1952 | Syrovy | 60/54 |
| 2,858,681 | 11/1958 | Smirl et al. | 464/84 X |
| 3,300,971 | 1/1967 | Qualman et al. | 60/54 |
| 3,489,256 | 1/1970 | Binder et al. | 192/98 |
| 3,845,622 | 11/1974 | Hufstader | 60/330 |
| 3,871,499 | 3/1975 | Kazuma | 192/70.29 |
| 4,595,382 | 6/1986 | Ohkubo | 464/82 |

Primary Examiner—William E. Wayner
Attorney, Agent, or Firm—James A. Geppert

[57] ABSTRACT

A drive strap utilized for a torque converter of an automotive vehicle accommodating minor misalignment but providing effective transmission of torque. The strap assembly includes thin, flexible straps and very stiff back-stops adjacent one end of each strap to provide a characteristic of increasing axial stiffness as strap deflection increases.

7 Claims, 4 Drawing Figures

VARIABLE RATE DRIVE STRAP

BACKGROUND OF THE INVENTION

The purpose of a torque converter attaching means, such as a drive plate, is to transmit torque, under minor misalignment conditions, between a vehicle engine and a transmission. Conventionally, a drive plate is secured at its inner periphery to the engine drive shaft, such as by bolts, and rigidly secured, as by bolts and/or alignment pins, to the housing for the torque converter; which housing is connected to and drives the impeller or pump of the torque converter.

The attaching means between the engine drive shaft and the torque converter must be flexible enough to accommodate minor misalignment, but must be stiff enough to avoid excessive axial movement of the torque converter. A drive strap would appear to be an economical way to achieve the function of transmitting torque, however, such a strap is generally too flexible to limit the axial movement of the converter under thrust load. The present invention overcomes the above disadvantages of a flexible drive strap for driving a torque converter.

SUMMARY OF THE INVENTION

The present invention relates to an improved drive strap assembly to be utilized between a flywheel and torque converter housing wherein the strap asembly includes thin flexible straps combined with very stiff back-stops. Each drive strap is connected at one end to a mounting boss on the torque converter housing and the opposite end is sandwiched between a pair of back-stops and secured to the flywheel driven by the vehicle engine. The back-stops are designed to limit both the forward and rearward thrust of the torque converter assembly by means of a pre-determined radius designed into each back-stop.

Further objects are to provide a construction of maximum simplicity, efficiency, economy and ease of assembly, and such further objects, advantages and capabilities as will later more fully appear and are inherently possessed thereby.

DESCRIPTION OF THE PREFERRED EMBODIMENT

Figure 1:
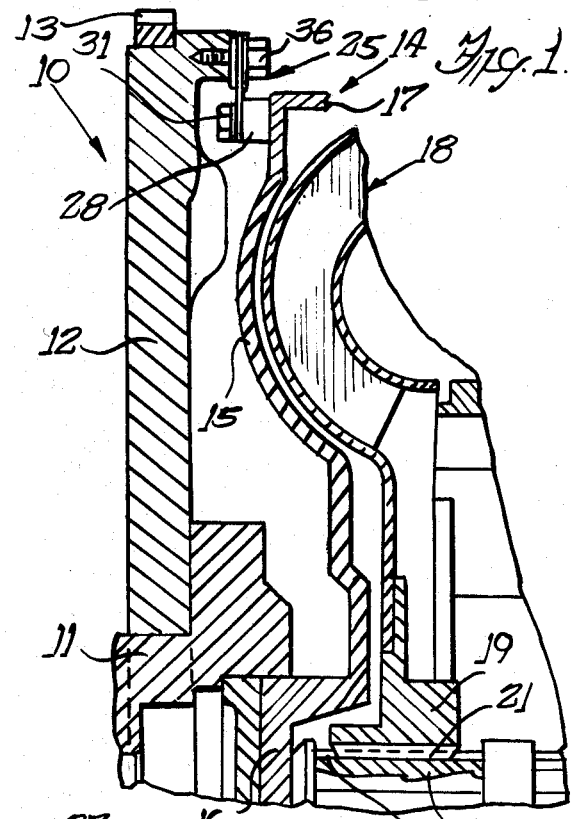
FIG. 1 is a partial cross sectional view of a flywheel and torque converter connected by the drive strap assembly of the present invention.
Figure 2:
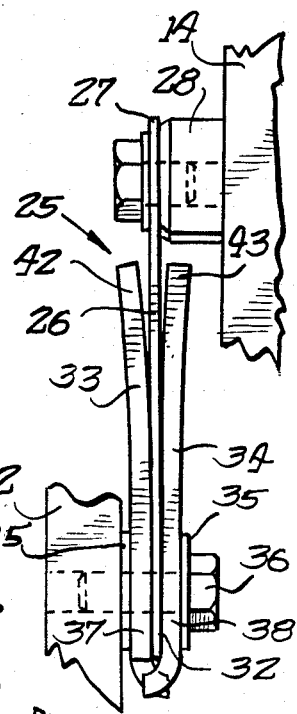
FIG. 2 is an enlarged side elevational view of the drive strap assembly.

Referring more particularly to the disclosure in the drawing wherein is shown an illustrative embodiment of the present invention, FIG. 1 discloses a torque converter assembly 10 including a drive hub 11 suitably secured to the engine drive shaft (not shown) and suitably secured to a flywheel 12 having starter gear teeth 13 on its outer periphery. A torque converter housing 14 includes a generally radial portion 15 journalled at its inner periphery 16 within the drive hub 11 and an outer housing portion 17 extending over the turbine 18 and the impeller (not shown) to which it is drivingly connected. The turbine 18 is of conventional construction and includes an inner turbine hub 19 having internal splines 21 engaging the external splines 22 of a transmission input shaft 23 extending to the vehicle transmission (not shown).

Drivingly connecting the engine flywheel 12 with the torque converter housing 14 are a plurality of circumferentially spaced drive strap assemblies 25 which provide sufficient flexibility for minor misalignment but which have sufficient stiffness to limit axial movement of the torque converter under thrust load. Each assembly 25 includes one or more flexible drive straps 26 connected at one end 27 by a washer 29 and a bolt 31 to a mounting boss 28 welded to the torque converter housing 14. The opposite end 32 of the drive strap is sandwiched between a pair of back-stops 33 and 34 and secured to the flywheel 12 by washers 35 and a bolt 36.

Figure 3:
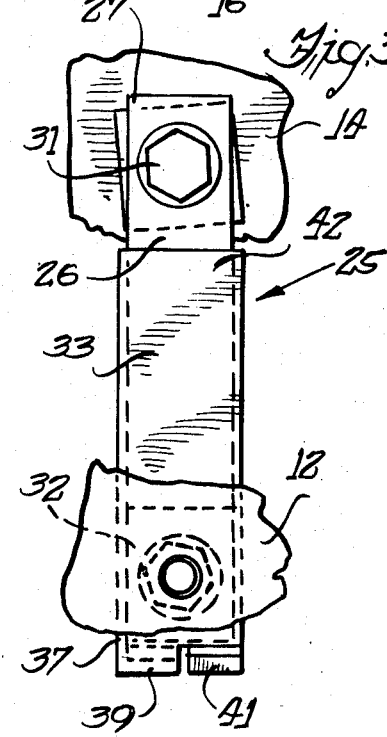
FIG. 3 is an enlarged plan view of the drive strap assembly.

Each back-stop 33 and 34 is very stiff and provided with an inner end 37 and 38 having a bent lip 39 and 41 and with an outwardly curved free end 42 and 43, respectively. Each bent lip 39 and 41 is one-half the width of the back-stop to interengage as shown in FIG. 3. The radius of each drive strap free end 42 and 43 is designed to limit the forward and rearward thrust of the torque converter assembly. The lips 39,41 of the back-stops 33 and 34 at the flywheel end act to engage each other and the drive strap end 32 during assembly to keep the back-stops and drive strap parallel to each other after attachment.

Figure 4:
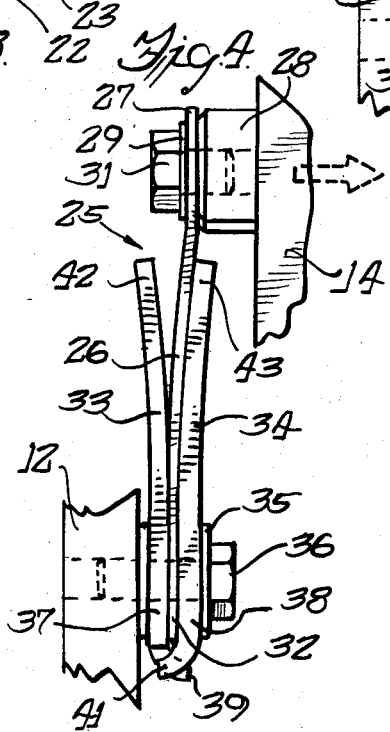
FIG. 4 is a side elevational view similar to FIG. 2, but showing the drive strap in a flexed condition.

As the converter assembly 10 moves rearward and forward, as seen in FIG. 4, each flexible drive strap 26 moves along the face of one or the other back-stop 33 or 34 decreasing the moment arm of drive strap 26 between the mounting boss 28 and flywheel attachment bolt 36, thus increasing the spring rate of the drive strap. Therefore, the result of using the back-stops is a characteristic of increasing axial stiffness as strap deflection increases. This is because of the fact that the effective lever arm of the drive strap is being reduced as the strap is deflected against the stiff, curved back-stop; the stiffness or spring rate of the strap varying as a function of the deflection.

I claim:

1. A drive strap assembly adapted for utilization between an engine flywheel and a torque converter housing, comprising an elongated relatively flexible drive strap secured at its opposite ends to the flywheel and the torque converter cover, and a pair of relatively stiff back-stops sandwiching one end of said drive strap, the back-stops having free ends being oppositely outwardly curved away from the drive strap.

2. A drive strap assembly as set forth in claim 1, wherein said back-stops are secured at one end with said drive strap to the flywheel, and the back-stops extend over substantially the entire flexible portion of the drive strap.

3. A drive strap assembly as set forth in claim 2, wherein the fixed end of each back-stop is provided with an inturned lip engaging the end of the drive strap.

4. A drive strap assembly as set forth in claim 3, in which the lips of said back-stops are offset to interlock together and interact with said strap to retain the drive strap and back-stops parallel.

5. A drive strap assembly as set forth in claim 1, wherein said back-stops are provided with a pre-determined radius to limit forward and backward thrust of the torque converter assembly.

6. A drive strap assembly as set forth in claim 5, wherein axial movement of the torque converter relative to the flywheel causes the drive strap to move along one of the faces of the back-stops and decreases the moment arm of the drive strap.

7. A drive strap assembly as set forth in claim 5, wherein the axial stiffness of said flexible drive strap increases with increasing strap deflection.

* * * * *